United States Patent Office 3,493,523
Patented Feb. 3, 1970

3,493,523
SENSITIZATION OF LATEX FOAM RUBBER TO GELATION
Anthony G. Fox and Douglas G. Walters, Sarnia, Ontario, Canada, assignors to Polymer Corporation Limited, Sarnia, Ontario, Canada, a body corporate and politic
No Drawing. Filed Oct. 27, 1966, Ser. No. 589,817
Claims priority, application Canada, Aug. 9, 1966, 967,438
Int. Cl. C08d 7/16, 13/08
U.S. Cl. 260—2.5    8 Claims

ABSTRACT OF THE DISCLOSURE

The sensitivity of a foamed latex compound to gelation is increased by including in the foamed latex a polyalkylene polyamine obtained by condensing to a viscosity average molecular weight of 500–100,000 ammonia or a low molecular weight polyalkylene polyamine such as tetraethylene pentamine with an aliphatic hydrocarbon containing two groups reactive with amines and at least one of which groups is a halogen atom, such as dichloroethane.

---

This invention relates to the preparation of latex foam rubbers and more particularly to the step of gelling the foamed latex during the preparation procedure.

In preparing latex foam rubbers, a high solids content latex normally containing higher than 55% and usually higher than 60 weight percent total solids is compounded with the required materials, foamed, moulded, gelled, vulcanized, washed and dried. Compounding materials may include foaming agents, fillers, antioxidants, vulcanizing agents, vulcanization accelerators, gel sensitizers, gelling agents, etc. In order that foam rubbers having acceptable physical properties and appearance may be obtained, it is necessary to have the gelation take place before breakdown of the foam structure begins. To speed up or sharpen up the gelling action, it is normal practice to include a secondary gelling agent commonly called a sensitizer or gell sensitizer among the materials compounded into the latex. When moulded latex foam rubbers are produced by the Dunlop process, the two most widely used gelling agents are sodium silicofluoride and ammonium acetate and the most popular gel sensitizer is a reaction product of ethyl chloride, formaldehyde and ammonia, most often identified by the trademark "Trimene Base." Guanidines such as diphenyl guanidine, low molecular weight polyamines such as triethylene tetramine and tetraethylene pentamine, cationic soaps and certain phenols and water-soluble silicates also have been employed as gel sensitizers. While all of the above-mentioned gel sensitizers are varyingly effective, improvements are desirable with respect to their individual effect on one or more considerations such as colour imparted to the foam rubber, amount of sensitizer required to be used, foamability of the latex, foam fluidity, foam stability, toxicity, cost and availability of the sensitizer compound.

It has now been found that polyalkylene polyamines characterized by a viscosity average molecular weight of about 500–100,000 can be used as gelation sensitizers to prepare latex foam rubbers of improved whiteness and lower cost.

More specifically, it has been found that improved latex foam rubbers may be produced in a process comprising compounding, foaming, gelling and vulcanizing a latex of a rubbery polymer containing at least about 55 weight percent solids, by the step of including in the foamed latex prior to gelation of the foam a condensation product of a nitrogen-containing compound described by the general formula $H(HNC_nH_{2n})_xNH_2$, where $n$ is 1–3 and $x$ is 0–6, with a $C_1$–$C_5$ aliphatic hydrocarbon compound having at least two separated reactive groups which are reactive with amines, at least one of which is a halogen atom, the condensation product being characterized by a viscosity average molecular weight in the range of about 500–100,000 and being employed in amount of 0.1–1.0 part by weight per 100 parts by weight of total solids in the uncompounded latex, said nitrogen-containing compound and said halogen-containing compound being reacted in a molar ratio of 0.5–3.5/1. respectively.

The two basic gelling systems for latex foam rubber are (1) heat gelling in which the application of heat causes phase inversion of a foam and (2) delayed-action gelling systems in which phase inversion takes place in a controllable predetermined time without any substantial change in temperature after the addition of the gelling agent. The high molecular weight polyalkylene polyamines of the present invention may be used to sensitize the latex foam in each system but application is particularly visualized in the delayed-action systems in which acid-acting fluo complexes such as sodium silicofluoride, whether in combination or not with a compound functioning such as zinc oxide does, are most often employed as the gelling agents.

The high molecular weight polyalkylene polyamines may be described as comprising condensation products of nitrogen-containing compounds described by the general formula $H(HNC_nH_{2n})_xNH_2$ where $n$ is an integer, preferably 1–3 and $x$ is zero or more and preferably 0–6, with lower aliphatic hydrocarbon compounds, i.e., $C_1$–$C_5$ having at least two separated reactive groups reactive with amines at least one of which groups is a halogen atom. Examples of suitable groups which are reactive with amines are epoxy, hydrogen sulfate, chlorine, bromine, etc. radicals. The preferred lower aliphatic compounds contain 2–3 carbon atoms and chlorine or bromine as the halogen. As examples of suitable nitrogen-containing compounds, there may be mentioned ammonia, ethylene diamine, propylene diamine, diethylene triamine, triethylene tetramine, tetraethylene pentamine, pentaethylene hexamine, dipropylene triamine, tributylene tetramine, etc. The halogen-containing lower aliphatic compounds may be exemplified by compounds such as 1,2-dichloroethane, 1,3-dichloropropane, 1,4-dichlorobutane, 1,2-dibromoethane, 1,3-dibromopropane and other haloalkanes preferably containing a halogen atom on each terminal carbon atom, epichlorohydrin, epibromohydrin, alpha-dichlorohydrin, etc. It has been found that the condensation products may be employed in solution in water or alcohol and they may be in free base or hydrohalide form. Effective products are obtained when about 0.5–3.5 moles of the nitrogen-containing compound are reacted per mole of the halogen-containing compound with the preferred ratio being 1–3/1. A particularly suitable product is obtained by condensing ammonia with 1,2-dichloroethane at about a mole for mole ratio to a molecular weight of about 500–1500 so as to contain a minimum amount of tertiary nitrogen and isolating the product in the free base form.

The gelation sensitizing agents may be applied to the production of latex foam rubbers from high solids content latexes of rubbery polymers which may, if desired, be blended with minor proportions of latexes of resinous polymers. As examples of rubbery polymers, there may be mentioned homopolymers of low molecular weight conjugated diolefins such as butadiene-1,3, isoprene, chloroprene and piperylene—with natural rubber being considered as a homopolymer of isoprene, and copolymers of these conjugated diolefins with each other or with one or more copolymerizable monoolefinic monomers such as styrene, acrylonitrile, acrylic acid, methyl methacrylate, vinyl chloride, vinyl acetate, etc., while as resinous polymers there may be mentioned polystyrene, polyacrylonitrile, polyvinylidene chloride, polyvinylchloride, polyvinylacetate, polymethylacrylate and copolymers of the monomers of the foregoing resinous polymers, etc. Included also would be copolymers of the foregoing mono-olefinic monomers with minor proportions of diolefinic monomers and graft copolymers of one or more of the foregoing monomers with one or more of the foregoing polymers.

In preparing the latex foam rubbers, the usual compounding ingredients and procedures can be employed. Generally, the compounding is carried out in two stages. In the first stage, the vulcanizing agent and one or more vulcanization accelerators are blended into the latex. There may also be added at this stage other frequently used materials e.g. a process oil, an antioxidant, a soap, a filler water and the gelation sensitizing agent and the compounded latex is allowed to mature if desired. The latex is next foamed by beating air into it by mechanical agitation and after the foam volume has been raised to the desired extent, the gelling agent is thoroughly blended, i.e. compounded into the foam. The foamed latex is then poured into moulds and permitted to gel to reticulation either at ambient temperatures or after warming to about 30–45° C. The gel is then vulcanized by raising the temperature to the desired level e.g. about 100° C.

The above-mentioned compounds may be incorporated into the latex in the quantities usually employed. Thus the compounded latex may contain for every 100 parts by weight of vulcanizable rubbery polymer 1–5 parts by weight by vulcanizing agent which is usually sulfur, 0.5–7.5 parts by weight of vulcanization accelerator e.g. zinc diethyl dithiocarbamate and zinc 2-mercaptobenzothiazole, 1–50 parts process oil, 0.5–2.0 parts antioxidant e.g. 2,2'-methylene-bis(4-methyl - 6 - tertiary butyl phenol), 0.1–5 parts of soap e.g. caster and tall oil soaps, potassium, oleate etc., 0–200 or more parts of filler e.g. clay, whiting, talc, lithopone, etc., water when desired to reduce the total solids level, and gelation sensitizer. The amount of the gelation sensitizer of the present invention to be used is variable depending on the particular compound chosen and may vary generally from about 0.1 to 1.0 part dry weight i.e. 100% activity basis, per 100 parts by weight of total solids in the uncompounded latex. It is preferably between about 0.2 and 0.6 part with latexes comprising rubbery butadiene-styrene copolymer when the hydrochloride form of the condensation product of 1,2-dichloroethane and ammonia is used. When this condensation product is in the free base form, the preferred amount is between about 0.25 and 0.35 part. It has been found advantageous when using the hydrochloride form to raise the pH of the compound to 10.5–11.5 with a fixed alkali such as potassium hydroxide before adding the sensitizing agent and the sensitizing agent should preferably be added as a solution in water. The best solution concentration is variable depending on the particular sensitizer used. The presence of formaldehyde in the sensitizer is undesirable as it has been found to raise the viscosity and coagulum level undesirably in the compounded latex. The compounding ingredients are normally incorporated into the latex and foam at ambient temperatures as is the gelling agent. As indicated earlier, acid-acting alkali metal silicofluorides are most often employed as the gelling agents and they are usually employed in combination with zinc oxide. Other acid-acting gelling agents such as ammonium acetate and ammonium sulphate may be used also, Normally 0.5–5 parts by weight of each of zinc oxide and the acid-acting gelling agent are employed, and in the present invention the preferred level appears to be about 2–3 parts.

The following examples illustrate the invention and certain of its specific aspects more thoroughly. All parts are by dry weight.

EXAMPLE I

A synthetic latex having a total solids content of about 65 weight percent with about 15% of the polymer particles in the latex being polystyrene and about 85% of the polymer particles being a rubbery copolymer of butadiene and styrene containing about 22% copolymerized styrene was compounded both by itself and mixed with deammoniated natural rubber latex in the recipes shown in Table I using two gelation sensitizing agents of the present invention. Sensitizer A, which was used as a 4.5% solution in water, is the condensation product obtained by reacting 1,2-dichloroethane and ammonia in a molar ratio of 1/2.5. It had a molecular weight in the range of about 500–1500, contained about 25 weight percent each of primary and secondary amino groups and about 50% tertiary amino groups mostly as piperazine rings and was recovered in hydrochloride form. Sensitizer B, which was used as a 7.5% solution in water, was obtained by condensing the same reactants in a molar ratio of 1/1 to a molecular weight of about 500–1500. It was recovered in the free base form and contained 50–70% tertiary amino groups in predominantly non-heterocyclic form. Triethyl trimethylene triamine was used as a comparison sensitizer as a 50% solution in water—it being a widely used sensitizer more popularly known by its trademark "Trimene Base."

The latex compounds were matured overnight at room temperature in a 50% humidity atmosphere prior to addition of the zinc oxide, foaming and addition of the gelling agents. Foaming was done in a Hobart mixer. Curing was carried out for 25 minutes in live steam for all samples except 9 and 10 which were cured for 18 minutes at 325° F. in a force-air circulating oven. The latex foam rubbers were tested as shown in Table I.

TABLE I

| Sample No. | 1 | 2 | 3 | 4 | 5 | 6 | 7 | 8 | 9 | 10 | 11 | 12 | 13 |
|---|---|---|---|---|---|---|---|---|---|---|---|---|---|
| Synthetic latex solids | 100 | 100 | 100 | 100 | 100 | 100 | 100 | 100 | 100 | 100 | 50 | 100 | 100 |
| Natural latex | | | | | | | | | | | 50 | | |
| Zinc diethyldithiocarbamate | 1.0 | 1.0 | 1.0 | 1.0 | 1.0 | 1.0 | 1.0 | 1.0 | 1.5 | 1.5 | 1.0 | 1.0 | 1.0 |
| Zinc mercaptobenzothiazole | 1.0 | 1.0 | 1.0 | 1.0 | 1.0 | 1.0 | 1.0 | 1.0 | 1.0 | 1.0 | 1.0 | 1.0 | 1.0 |
| Sulphur | 2.0 | 2.0 | 2.0 | 2.0 | 2.0 | 2.0 | 2.0 | 2.0 | 2.5 | 2.5 | 2.0 | 2.0 | 2.0 |
| Antioxidant | 1.0 | 1.0 | 1.0 | 1.0 | 1.0 | 1.0 | 1.0 | 1.0 | 1.0 | 1.0 | 1.0 | 1.0 | 1.0 |
| Potassium oleate | 0.4 | 0.4 | | | | | 0.4 | 0.4 | 0.5 | 0.5 | | | |
| Castor oil soap | | | 0.75 | 0.5 | 0.5 | 0.5 | | | | | 0.75 | 0.5 | 0.5 |
| Tall oil soap | | | | | | | | | 1.0 | 1.0 | | | |
| Potassium hydroxide | | | 0.3 | 0.3 | 0.3 | 0.3 | | | 0.2 | 0.3 | 0.15 | | 0.3 |
| Ammonia | | 0.3 | | | | | | | 1.0 | 1.0 | | | |
| Feldspar | | | | | | | | | 100 | 100 | | | |
| Sensitizer A (pure basis) | | 0.35 | 0.35 | 0.35 | 0.45 | 0.55 | | | | 0.35 | 0.22 | | 0.35 |
| Sensitizer B (pure basis) | | | | | | | 0.15 | 0.25 | 0.30 | | | | |
| Trimene Base (as received) | 1.0 | | | | | | | | | | | 1.0 | |
| Sodium silicofluoride | 2.25 | 2.25 | 2.25 | 2.25 | 2.25 | 2.25 | 2.25 | 2.25 | | | | 2.5 | 2.5 |
| Ammonium acetate | | | | | | | | | (*) | (*) | | | |
| Zinc oxide | | | | 3.0 | 3.0 | 3.0 | 3.0 | 3.0 | 3.0 | 3.0 | | 3.0 | 3.0 |
| Compound properties: | | | | | | | | | | | | | |
| Viscosity, poise | 4.0 | 10.5 | 2.7 | | | | 4.0 | 4.5 | 21.2 | 35.4 | 2.0 | | |
| Coagulum, percent | 0.01 | 0.3 | 0.03 | | | | | | | | 0.02 | | |
| pH | 10.7 | 10.8 | 10.4 | | | | 9.9 | 9.8 | 11.6 | 11.7 | 10.1 | | |
| Processing: | | | | | | | | | | | | | |
| Froth time, minutes | 1.7 | 2.25 | 2.25 | | | | 2.1 | 2.2 | | | 2.0 | | |
| Froth viscosity, poise | 43 | 43 | 48 | | | | 62 | 62 | | | 90 | | |
| Gel time, minutes | 7.75 | 13.0 | 6.5 | | | | 5.25 | 6.75 | | | 7.5 | | |

TABLE I.—Continued

| Sample No | 1 | 2 | 3 | 4 | 5 | 6 | 7 | 8 | 9 | 10 | 11 | 12 | 13 |
|---|---|---|---|---|---|---|---|---|---|---|---|---|---|
| Gel pH | 8.65 | 9.1 | 8.7 | | | | | 8.6 | 8.65 | | | 8.8 | |
| Gel range, parts ammonium acetate* | | | | | | | | | | 1.0-1.4 | 0.8-1.2 | | |
| Foam structure | Good | Good | Good | Good | Good | Good | Fair | Good | Good | Good | Good | Good | Good |
| Physical properties: | | | | | | | | | | | | | |
| Density, lbs./ft.³ | 4.50 | 4.46 | 4.49 | | | | | 4.75 | | | 4.94 | 7.7 | 8.1 |
| Compression set, percent | 4.0 | 3.4 | 7.3 | | | | | 6.1 | | | 5.2 | 5.4 | 5.9 |
| Elongation at break, percent | 190 | 165 | 160 | | | | | 215 | | | 265 | 165 | 175 |
| Tensile strength, lbs./in.² | 3.4 | 4.1 | 4.4 | | | | | 6.5 | | | 6.0 | 5.9 | 7.3 |
| Compression modulus at— | | | | | | | | | | | | | |
| 25% compression, lbs./in.² | 0.21 | 0.18 | 0.24 | | | | | 0.35 | | | 0.20 | 1.01 | 1.20 |
| 40% compression, lbs./in.² | 0.42 | 0.37 | 0.44 | | | | | 0.61 | | | 0.35 | 1.80 | 2.06 |
| 50% compression, lbs./in.² | 0.66 | 0.57 | 0.67 | | | | | 0.89 | | | 0.54 | 2.66 | 3.03 |
| Permanent set, percent | 2.9 | 3.0 | 0.6 | | | | | | | | 0.6 | 6.2 | 2.0 |
| Modulus loss after flexing at— | | | | | | | | | | | | | |
| 25% compression, percent | | | | | | | | | | | | 8.9 | 13.3 |
| 40% compression, percent | | | | | | | | | | | | 7.1 | 8.7 |
| 50% compression, percent | | | | | | | | | | | | 0.0 | 0.0 |
| Flex set, percent | | | | | | | | | | | | 3.0 | 2.6 |

These results show that excellent quality foam rubbers can be prepared with the novel sensitizers of this invention and they have the advantage of being whiter in colour than those prepared with the comparison sensitizer.

EXAMPLE II

Samples of the latex of Example I were compounded as shown in Table II. Maturing was at ambient temperature overnight with the zinc oxide being added shortly before foaming and the sodium silicofluoride being blended into the compounds during foaming. The compounds were run continuously through an 8 M Oakes mixer for one hour at a rate of about 235 wet pounds of foam per hour. At the conclusion of each run the Oakes mixer was examined and found to contain little or no coagulum.

The results show that the use of these sensitizers will not cause fouling of the foaming equipment due to undesirable destabilization of the compounded latex.

TABLE II

| | | |
|---|---|---|
| Synthetic latex solids | 100 | 100 |
| Zinc diethyldithiocarbamate | 1.0 | 1.0 |
| Zinc mercaptobenzothiazole | 1.0 | 1.0 |
| Sulphur | 2.0 | 2.0 |
| Antioxidant | 1.0 | 1.0 |
| Castor oil soap | 0.5 | 0.5 |
| Potassium hydroxide | 0.3 | |
| Sensitizer A | 0.35 | |
| Sensitizer B | | 0.30 |
| Zinc oxide | 3.0 | 3.0 |
| Sodium silicofluoride | 2.5 | 2.3 |

EXAMPLE III

The effectiveness of Sensitizers A and B of Example I was determined when applied to the following latexes:

Latex A—a high solids natural rubber latex which had been deammoniated to 0.2% ammonia.

Latex B—a latex of a rubbery copolymer of butadiene and styrene containing 22% copolymerized styrene, with the latex having a total solids content of 67 weight percent.

Latex C—a latex of a rubbery copolymer of butadiene and acrylonitrile containing 20% copolymerized acrylonitrile, with the latex having a total solids content of 64 weight percent.

Latex D—an artificial latex prepared from a solution of a rubbery isoprene homopolymer which had been polymerized in solution to a high cisconfiguration in its molecular structure. The latex had a solids content of 65 weight percent.

The compounding recipes and results are recorded in Table III. The procedure in this series varied from that of Examples I and II in that the zinc oxide was added during foaming.

TABLE III

| | Latex A | | Latex B | | Latex C | | Latex D | |
|---|---|---|---|---|---|---|---|---|
| Latex solids | 100 | 100 | 100 | 100 | 100 | 100 | 100 | 100 |
| Zinc diethyldithiocarbamate | 1.0 | 1.0 | 1.0 | 1.0 | 1.0 | 1.0 | 1.0 | 1.0 |
| Zinc mercaptobenzothiazole | 1.0 | 1.0 | 1.0 | 1.0 | 1.0 | 1.0 | 1.0 | 1.0 |
| Sulphur | 2.0 | 2.0 | 2.0 | 2.0 | 2.0 | 2.0 | 2.0 | 2.0 |
| Antioxidant | 1.0 | 1.0 | 1.0 | 1.0 | 1.0 | 1.0 | 1.0 | 1.0 |
| Castor oil soap | 0.75 | 0.75 | 0.5 | 0.5 | | | 0.5 | 0.5 |
| Potassium hydroxide | 0.15 | | 0.15 | | 0.3 | | 0.3 | |
| Sensitizer A | 0.15 | | 0.25 | | 0.45 | | 0.25 | |
| Sensitizer B | | 0.15 | | 0.15 | | 0.40 | | 0.15 |
| Zinc oxide | 3.0 | 3.0 | 3.0 | 3.0 | 3.0 | 3.0 | 3.0 | 3.0 |
| Sodium silicofluoride | 1.75 | 1.75 | 2.25 | 2.25 | 2.50 | 2.50 | 2.0 | 2.0 |
| Compound pH | 9.3 | 9.4 | 10.0 | 9.6 | | 9.8 | 10.6 | 10.6 |
| Compound viscosity, poise | 3.0 | 5.0 | 0.2 | 5.0 | 1.5 | 2.0 | 47 | 25 |
| Froth time, minutes | 1.8 | 1.5 | 2.8 | 2.3 | | 2.2 | 2.3 | 1.0 |
| Froth viscosity, poise | | | 49 | 30 | 33 | 37 | 84 | 29 |
| Gelation pH | 8.3 | | 8.7 | 8.7 | 8.4 | 8.7 | | 8.3 |
| Gelation time, minutes | 4.0 | 4.0 | 9.2 | 6.3 | 13.5 | 8.5 | 10 | 6.8 |
| Foam structure | Good | Good | Good | Good | Good | Good | Fair | Fair |

These results show that the sensitizers of this invention can be successfully applied to the preparation of good foam rubbers from a wide variety of latexes.

EXAMPLE IV

The latex of Example I was employed to test the effectiveness of a number of other sensitizing agents described below.

Sensitizer C—Methyl quaternary form of Sensitizer B.
Sensitizer D—Free base form of Sensitizer A.
Sensitizer E—Sensitizer A as a solution in ethyl alcohol.
Sensitizer F—Sensitizer A with unreacted ammonia removed.
Sensitizer G—Condensation product of epichlorohydrin with tetraethylene pentamine reacted in a molar ratio of about 1.6/1 and recovered in free base form. Molecular weight range of the product was about 500–50,000.
Sensitizer H—Similar to Sensitizer G but having a somewhat higher molecular weight range.

Sensitizer J—Similar to Sensitizer H but in hydrochloride form.

The compounding, foaming, gelling and vulcanizing procedure of Example I was followed with the recipes and results being recorded in Table IV.

TABLE IV

| | Sensitizer | | | | | | |
|---|---|---|---|---|---|---|---|
| | C | D | E | F | G | H | J |
| Latex solids | 100 | 100 | 100 | 100 | 100 | 100 | 100 |
| Zinc diethyldithiocarbamate | 1.0 | 1.0 | 1.0 | 1.0 | 1.0 | 1.0 | 1.0 |
| Zinc mercaptobenzothiazole | 1.0 | 1.0 | 1.0 | 1.0 | 1.0 | 1.0 | 1.0 |
| Sulphur | 2.0 | 2.0 | 2.0 | 2.0 | 2.0 | 2.0 | 2.0 |
| Antioxidant | 1.0 | 1.0 | 1.0 | 1.0 | 1.0 | 1.0 | 1.0 |
| Potassium oleate | 0.4 | 0.4 | 0.4 | 0.4 | 0.4 | 0.4 | 0.4 |
| Amount of sensitizer | 0.29 | 0.28 | 0.32 | 0.15 | 0.15 | 0.15 | 0.32 |
| Zinc oxide | 3.0 | 3.0 | 3.0 | 3.0 | 3.0 | 3.0 | 3.0 |
| Sodium silicofluoride | 2.25 | 2.25 | 2.25 | 2.25 | 2.25 | 2.25 | 2.25 |
| Potassium hydroxide | | 0.35 | 0.31 | | | | 0.31 |
| Compound viscosity, poise | 2.8 | 4.1 | 4.1 | 68 | 51 | 27 | 28 |
| Compound pH | 9.7 | 11.4 | 11.1 | 10.4 | 10.2 | 10.1 | 11.2 |
| Froth time, minutes | 5 | 2.8 | 2.0 | 2.5 | 2.7 | 2.5 | 3.5 |
| Froth viscosity, poise | 67 | 63 | 48 | 60 | 66 | 65 | 55 |
| Gel time, minutes | 7.5 | 13.5 | 17.5 | 7.5 | 8.0 | 7.0 | 9.2 |
| Gel pH | 8.8 | 8.5 | 8.5 | 8.4 | 8.3 | 8.5 | 8.8 |
| Foam structure | Good | Good | Good | Good | Good | Good | Good |

We claim:

1. In a process comprising compounding, foaming, gelling and vulcanizing a latex of a rubbery polymer containing at least about 55 weight percent solids, the improvement which comprises the step of including in the foamed latex prior to the gelation step 0.1 to 1.0 part by weight per 100 parts by weight of total solids in the uncompounded latex, of a condensation product of a nitrogen-containing compound of the formula $$H(HNC_nH_{2n})_xNH_2$$

where $n$ is an integer of from 1 to 3 and $x$ is from 0 to 6, with a $C_1$ to $C_5$ aliphatic hydrocarbon compound having at least two separated reactive groups which are reactive with amines, at least one of said reactive groups being a halogen atom, the condensation product having a viscosity average molecular weight in the range of about 500 to 100,000 the nitrogen-containing compound and the aliphatic compound being reacted in a molar ratio of 0.5 to 3.5:1 respectively.

2. The process of claim 1 wherein the condensation product is in its free base or hydrochloride form.

3. The process of claim 1 wherein the condensation product is the free base form of the product obtained by condensing ammonia with 1,2-dichloroethane at about 1:1 molar ratio and the amount of condensation product is about 0.25 to 0.35 part.

4. The process of claim 1 wherein the condensation product is the hydrochloride form of the product obtained by condensing ammonia with 1,2-dichloroethane at about 2.5:1 molar ratio and the amount of condensation product used is about 0.2 to 0.6 part.

5. The process of claim 4 wherein sufficient fixed alkali to raise the pH of the latex to 10.5 to 11.5 is included in the latex before the condensation product is added.

6. The process of claim 2 wherein the rubbery polymer comprises a ploymerized low molecular weight conjugated diolefinic monomer.

7. The process of claim 2 wherein the latex comprises a major proportion of rubbery polymer and in relation thereto a minor proportion of resinous polymer.

8. The process of claim 2 wherein the latex comprises a rubbery polymer selected from the group consisting of natural rubber, butadiene-styrene copolymers, butadiene-acrylonitrile copolymers, polymerized low molecular weight conjugated diolefinic monomers, and blends of a rubbery butadiene-styrene copolymer with a minor proportion of a resinous styrene polymer.

References Cited
UNITED STATES PATENTS

| 2,776,330 | 1/1957 | Jones et al. |
| 3,015,641 | 2/1962 | Bawn et al. |
| 3,015,642 | 2/1962 | Bawn et al. |
| 3,107,224 | 10/1963 | Rodgers et al. |
| 3,238,172 | 3/1966 | Talalay et al. |

SAMUEL H. BLECH, Primary Examiner

MORTON FOELAK, Assistant Examiner

U.S. Cl. X.R.

260—2